United States Patent [19]
McClanahan et al.

[11] Patent Number: 6,130,607
[45] Date of Patent: Oct. 10, 2000

[54] BACK-UP PROTECTION SENSOR FOR A VEHICLE

[75] Inventors: David L. McClanahan, Greenfield; Birger Pahl, Milwaukee; Joseph C. Zuercher, Brookfield, all of Wis.

[73] Assignee: Eaton Corporation, Milwaukee, Wis.

[21] Appl. No.: 09/175,121

[22] Filed: Oct. 19, 1998

[51] Int. Cl.$^7$ ........................................... B60Q 1/00
[52] U.S. Cl. ...................... 340/436; 340/904; 342/70
[58] Field of Search ........................ 340/436, 435, 340/438, 904, 903, 901; 367/91; 342/70

[56] References Cited

U.S. PATENT DOCUMENTS

| | | | |
|---|---|---|---|
| Re. 34,773 | 11/1994 | Dombrowski | 340/904 |
| 2,863,145 | 12/1958 | Turner. | |
| 4,048,613 | 9/1977 | Ito et al. | 340/904 |
| 4,383,238 | 5/1983 | Endo | 340/904 |
| 4,524,356 | 6/1985 | Kodera et al. | 340/904 |
| 4,623,032 | 11/1986 | Kemmer | 340/904 |
| 4,803,488 | 2/1989 | Dombrowski | 340/904 |
| 5,028,920 | 7/1991 | Dombrowski | 340/904 |
| 5,402,129 | 3/1995 | Gellner et al. | 340/70 |
| 5,436,613 | 7/1995 | Ghosh et al. | 340/904 |
| 5,546,086 | 8/1996 | Akuzawa et al. | 340/904 |
| 5,612,685 | 3/1997 | Oliva | 340/904 |
| 5,650,765 | 7/1997 | Park | 340/904 |

OTHER PUBLICATIONS

R. Bawer and J.J. Wolfe, "The Spiral Antenna," 1960 IRE National Convention Record, Pt. 1, pp. 84–95.

B. R.–S. Cheo, V.H. Rumsey and W.J. Welch, "A Solution to the Frequency–Independent Antenna Problem," IRE Transactions on Antennas and Propagation, pp. 527–534, Nov. 1961.

J.D. Dyson, "The Equiangular Spiral Antenna," IRE Transactions on Antennas Propagation, pp. 181–187, Apr. 1959.

J.J.H. Wang and V.K. tripp, "Design of Muliocatve Spiral–Mode Microstrip Antennas," IEEE Transactions on Antenna and Propagation, vol. 39, No. 3, pp. 332–335, Mar. 1991.

Product Marketing Brochure, "the Guardian™to Microwave Back–up Warning System," Sense Technologies, Inc.

U.S. Ser. no. 741,281, K. Wipom et al., Filed Oct. 30, 1996.

*Primary Examiner*—Jeffery A. Hofsass
*Assistant Examiner*—John Tweel, Jr.
*Attorney, Agent, or Firm*—Hoffman & Baron, LLP

[57] ABSTRACT

A protection sensor for a lawn vehicle includes a substantially unidirectional antenna operatively coupled to a Doppler detection circuit. The Doppler detection circuit generates a radio frequency signal which is radiated by the antenna. When the radiated signal strikes an object, such as a person, animal or another moving lawn vehicle, within a predefined detection region of the sensor, the signal is reflected and received by the antenna. The Doppler detection circuit generates an output signal responsive to a difference in frequency between the radiated signal and the reflected signal, thereby indicating the presence of the moving object within the protection region of the sensor. The unidirectional antenna virtually eliminates false detections generated by the lawn vehicle, to which the sensor is mounted, or by the operator of the vehicle.

15 Claims, 8 Drawing Sheets

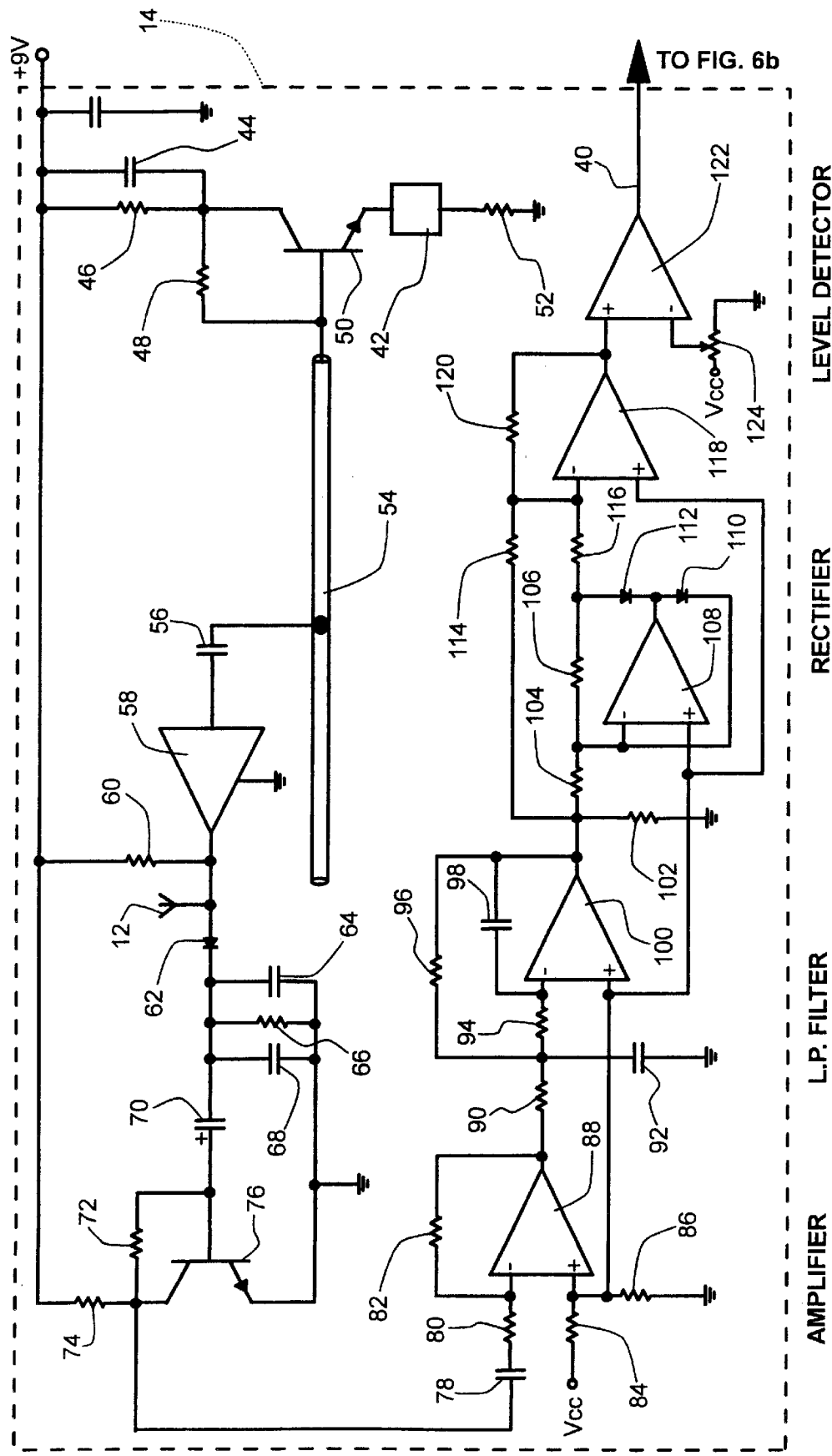

TIMER

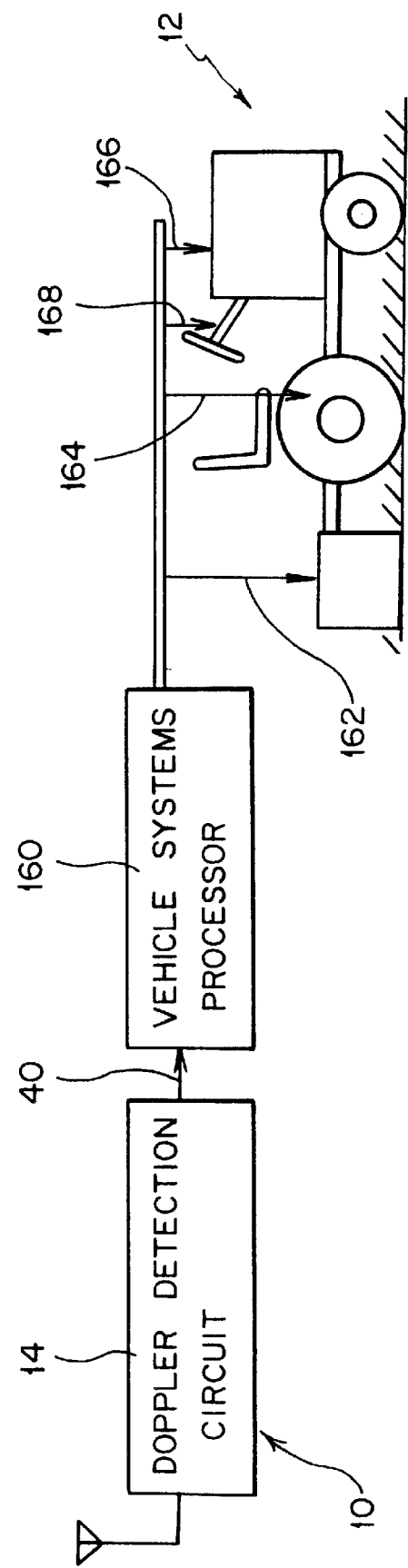

BACK-UP PROTECTION SENSOR FOR A VEHICLE

BACKGROUND OF THE INVENTION

1. Field of the Invention

The present invention relates generally to field disturbance sensors and more particularly relates to Doppler radar sensors adapted to sense the relative motion of life forms which are located behind a vehicle.

2. Description of the Prior Art

The problem of detecting people and animals in an area behind a vehicle is well established. This problem is particularly serious in the field of farm vehicles (e.g., tractors) and lawn mowing equipment. Presently, thousands of serious accidents occur each year resulting from the misuse of such equipment. These accidents are particularly tragic when they involve small children that have come up behind the vehicle while playing. A large percentage of the resulting injuries are inflicted when, for example, a tractor is backing up and inadvertently strikes an unseen victim. These injuries, including impact injuries and lacerations from contact with a spinning mower blade, are oftentimes severe.

Various forms of sensors have been employed in collision avoidance systems for vehicles. Among these systems are radio-based sensors (radar), ultrasonic sensors, laser-based radar and infrared (IR) sensors, each of which offers unique properties. Of these sensor technologies, Doppler radar sensors are particularly well suited for applications where it is desirable to detect human and/or animal motion.

Doppler radar sensors, which are well known in the art, are based on the principal of Doppler shift. In simple terms, energy waves (e.g., sound or electromagnetic) reflected off a moving target will exhibit a shift in frequency. The amount of frequency shift is directly proportional to the body's radial velocity relative to the source (either approaching or receding). This Doppler frequency shift $f_D$ obeys the relationship $$f_D = 2v_R f_o / c$$

where:

$f_o$ = transmitted frequency c = velocity of light ($3 \times 10^8$ m/s)

$V_R$ = relative velocity of body with respect to source (m/s)

Vehicles, such as lawn tractors, farm implements and the like, typically operate in an open outdoor environment which is subject to various sources of sensor interference. A typical environment may include fences, plastic trim or lawn furniture, dried wood, and/or concrete curbs which substantially interfere with the operation of conventional proximity sensors. The environment may also include thermal "hot spots," such as areas where solar heating occurs on the ground, which interferes with the operation of standard infrared sensors. Therefore, there remains a need for a protection sensor system for a vehicle which substantially overcomes the problems associated with devices known in the prior art.

OBJECTS AND SUMMARY OF THE INVENTION

It is an object of the present invention to provide a back-up protection sensor for a vehicle.

It is another object of the present invention to provide a protection sensor for a vehicle which can at least partially discriminate between moving life forms and inanimate objects (such as trees, buildings, or the like) located within a predetermined detection region.

It is yet another object of the present invention to provide a protection sensor system for a vehicle which alters the vehicle's operation when a moving body is detected within the detection region of the sensor.

It is a further object of the present invention to provide a protection sensor which employs Doppler radar to detect a life form in relative motion with respect to the protection sensor.

It is still a further object of the present invention to provide a protection sensor employing Doppler radar which is substantially immune from false sensing of the vehicle and/or the operator of the vehicle.

In accordance with one form of the present invention, a protection sensor is formed having a substantially directional antenna operatively coupled to a Doppler detection unit. The Doppler detection unit generates a signal in the radio frequency (RF) spectrum, which is radiated by the antenna in a predefined radiation pattern. When the radiated RF signal strikes a body within the detection region of the sensor, the signal is reflected and received by the antenna. The Doppler detection circuit generates an output signal in response to a difference in frequency between the radiated RF signal and the reflected signal received by the antenna. This output signal is indicative of the presence of a body that is moving relative to a vehicle within the detection zone of the sensor.

The present invention may include a cavity-backed spiral antenna, operatively coupled to the Doppler detection circuit. The cavity-backed spiral antenna establishes a substantially hemispherical radiation pattern which virtually eliminates false detections of the vehicle and/or operator.

In a preferred form of the present invention, a patch antenna is alternatively employed in place of the cavity-backed spiral antenna. The patch antenna similarly establishes a substantially hemispherical radiation pattern and may be fabricated directly on the printed circuit board, thereby reducing the size of the antenna as well as reducing the cost of manufacturing.

These and other objects, features and advantages of the present invention will become apparent from the following detailed description of illustrative embodiments thereof, which is to be read in connection with the accompanying drawings.

BRIEF DESCRIPTION OF THE DRAWINGS

FIGS. 6A and 6B are electrical schematic diagram of an exemplary Doppler detection circuit, formed in accordance with the present invention and depicted by the block diagram of FIG. 3.

FIG. 8 is a block diagram illustrating the electrical interface between a Doppler radar sensor, formed in accordance with the present invention, and a vehicle, such as a lawn tractor.

DETAILED DESCRIPTION OF THE PREFERRED EMBODIMENTS

Figure 1:
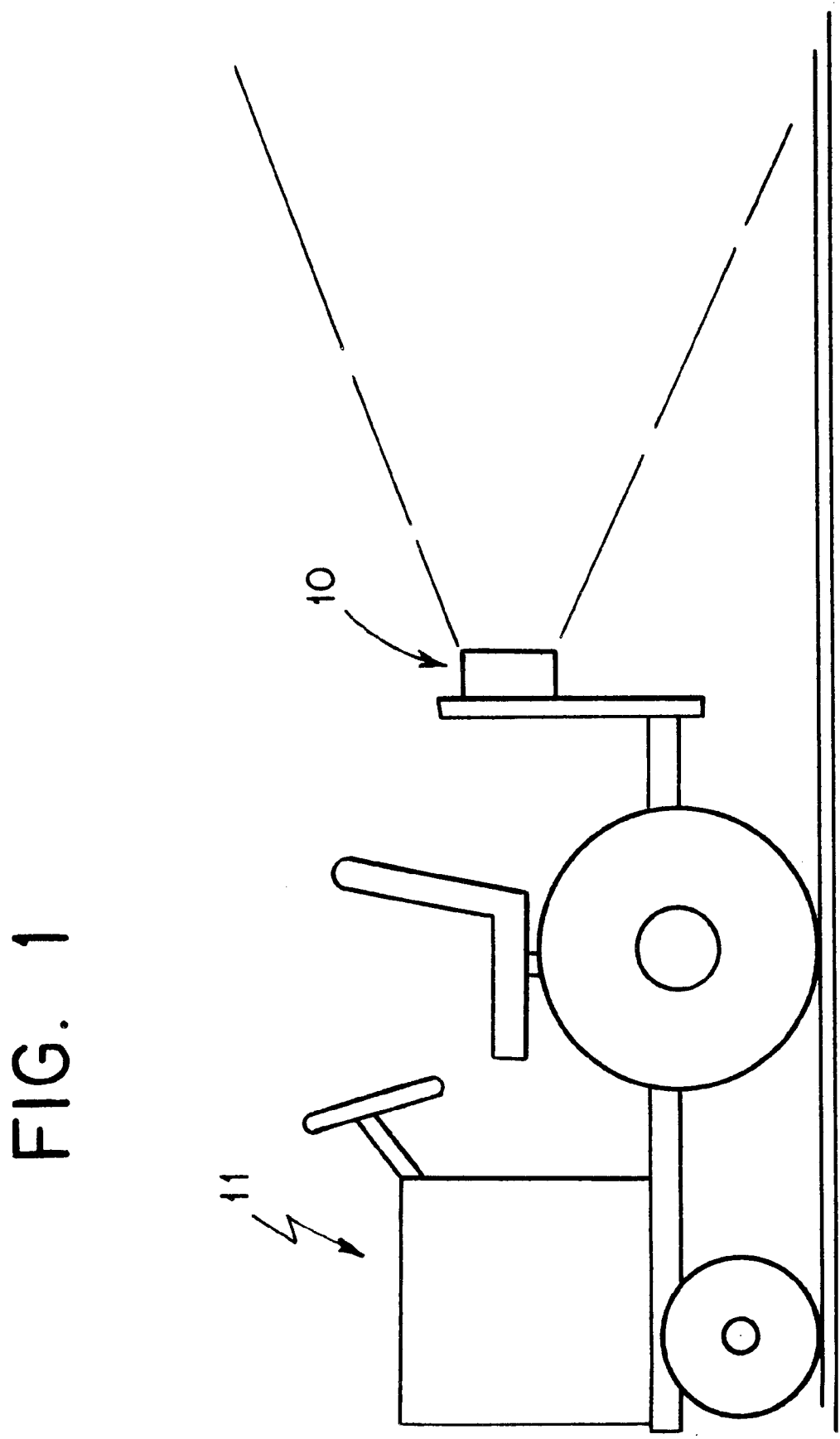
FIG. 1 is a pictorial view of a Doppler radar sensor formed in accordance with the present invention mounted on a vehicle, such as a tractor, the pictorial depiction illustrating the use of a Doppler field disturbance sensor to create a detection zone behind the vehicle.
Figure 2:
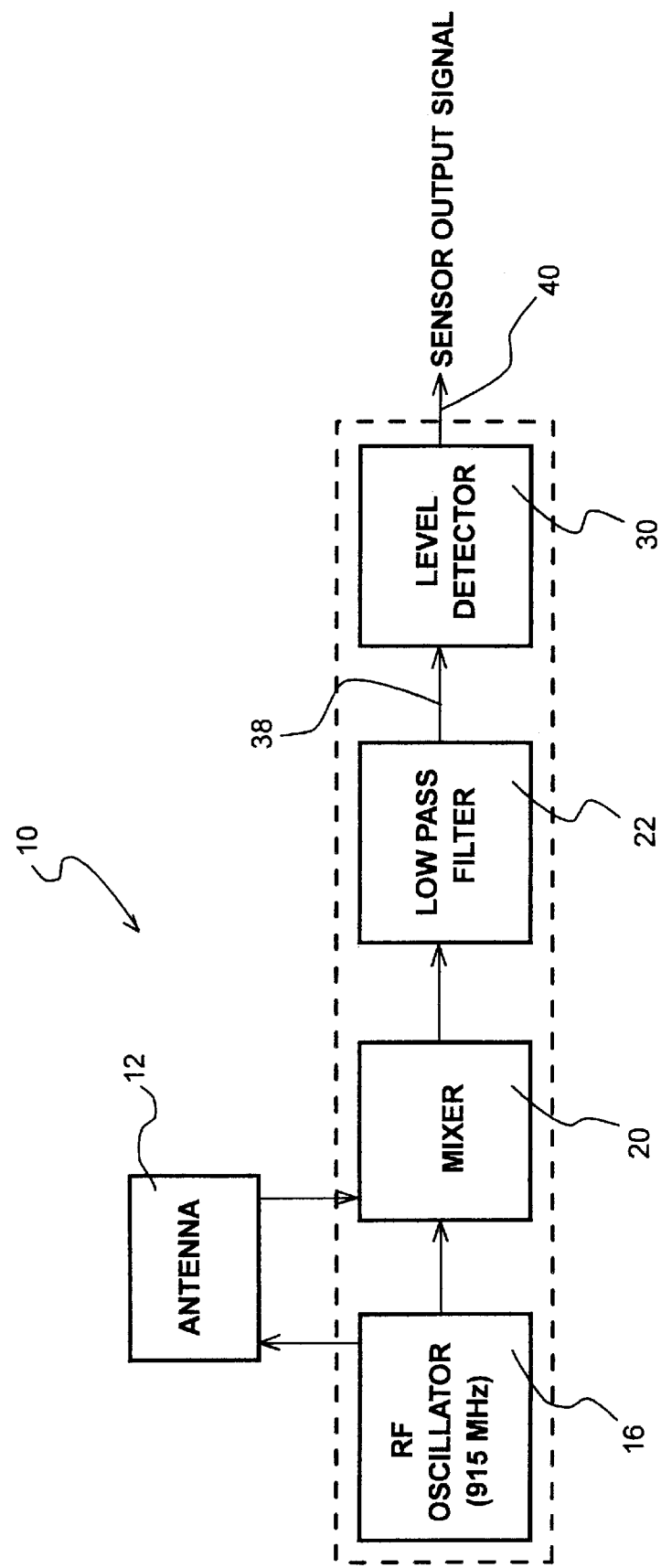
FIG. 2 is a block diagram of a detection circuit for a Doppler radar sensor formed in accordance with the present invention.

FIGS. 1 and 2 generally illustrate a back-up protection sensor formed in accordance with the present invention. Referring to FIG. 1, a protection sensor 10 is illustrated affixed to a rear portion of a vehicle 11, although the present invention is not limited to rear mounting. As illustrated in FIG. 2, the protection sensor 10 preferably includes an antenna 12 electrically coupled to a Doppler detection unit 14. The Doppler detection unit 14 preferably includes a signal generator 16, a mixer 20, a low pass filter 22 and a level detector 30. The signal generator 16 produces a signal, preferably in the radio frequency (RF) spectrum, which is fed to the antenna 12. The antenna 12 propagates the RF signal in a predefined radiation pattern in a region to be protected.

Preferably, the RF signal generator 16 may be implemented as a general purpose negative resistance reflection oscillator, although numerous oscillator circuits which are similarly capable of generating a RF signal are contemplated and are known by those skilled in the art. In a preferred embodiment of the present invention, the negative resistance reflection oscillator includes a single transistor and a microstrip line acting as the primary frequency-determining element. The microstrip line is preferably cut to a length making the oscillator operate at a frequency of about 915 MHZ (megahertz).

When the RF signal radiated from the antenna 12 strikes a conducting body within the detection region of the sensor, the signal is reflected and is received by the antenna 12. If the conducting body is in relative motion with respect to the antenna 12, the reflected signal will exhibit a frequency shift compared to the original radiated RF signal as a result of the well known Doppler effect. The shift in frequency between the radiated RF signal and the reflected signal is dependent on various factors, one of which being the relative velocity of the conducting body.

The reflected signal received by the antenna 12 is preferably fed to a mixer 20, which is operatively coupled thereto, where it is combined with at least a portion of the RF signal from the signal generator 16 to produce an intermediate frequency (IF) signal. The mixer 20 utilizes the trigonometric identity that expands the product of two cosine terms into sum and difference frequencies. This trigonometric identity is given as:

$$[a(t)\cos At][b(t)\cos Bt] = [a(t)b(t)/2][\cos(A-B)t + \cos(A+B)t]$$

The IF signal will therefore include a sum component and a difference component corresponding to the addition and subtraction of the RF signal and the reflected signal frequency respectively. Assuming that the shift in frequency of the reflected signal is very small, which is typically the case, the sum component of the IF signal will be almost twice the frequency of the RF signal. Furthermore, the difference component of the IF signal will be very low in frequency (typically less than 100 Hz). Suitable mixer circuits for use in the present invention are generally well known in the art and may be realized in various configurations.

In a preferred embodiment of the present invention, mixer 20 may be realized as a simple RF detector diode. The RF signal from the signal generator 16 and the reflected signal received by the antenna 12 are added and preferably passed through the RF detector (mixer) diode, although other practical mixer circuits are contemplated. The nonlinearities associated with the RF diode are primarily responsible for creating the desired sum and difference components of the resulting IF signal.

Preferably, the IF signal generated by the mixer 20 is subsequently passed through a low pass filter network 22 which substantially removes the high frequency sum component of the IF signal, as well as any other unwanted high frequency signals that are present. The resulting signal produced at the output of the low pass filter 22 will therefore be a very low frequency Doppler signal. The Doppler signal frequency will be proportional to the amount of Doppler frequency shift in the reflected signal, with the Doppler signal level relating to reflected power.

It will be clear to those skilled in the art that a number of filtering schemes may be employed to select only those frequency components of the IF signal that are of interest to the present invention. In general, ideal low pass filters exhibit a transfer function wherein signals below a predefined cutoff frequency $\omega_o$ pass without attenuation while signals above the cutoff frequency $\omega_o$ are blocked (termed a "brick wall" transfer function). Suitable low pass filters for use in the present invention include passive-type filters, such as a simple RC filter, or active-type filters, utilizing at least one operational amplifier (op amp) in combination with capacitors and resistors whose values are selectively chosen to produce a desired transfer function. Moreover, several low pass filter stages may be cascaded to obtain a transfer function having a steeper roll-off (i.e., having a higher order). The present invention, however, is not exclusively limited to the use of analog filters. A more comprehensive discussion of analog filters is presented in the text *Analog Filter Design*, by M. E. Van Valkenburg (Holt, Rinehart and Winston, Inc. 1982).

A level detector 30, operatively coupled to the output of the low pass filter 22, preferably monitors the Doppler signal level and generates a sensor output signal 40 when the Doppler signal level has exceeded a predefined threshold level. The sensor output signal 40 is preferably a binary (two-state) output signal (e.g., a logic level, such as zero and five volts) indicative of the presence or absence of a moving conductive body within the detection region of the sensor. In a preferred embodiment of the present invention, the level detector 30 may be realized as an analog comparator.

In general terms, an analog comparator preferably produces a binary output whose value is based upon a comparison of two analog inputs (defined as the non-inverting and the inverting input respectively). The output of the comparator is ideally "high" (e.g., the positive supply voltage) when the difference between the non-inverting and inverting inputs is positive, and "low" (e.g., zero volts or the negative supply voltage) when the difference is negative. In accordance with the present invention, the Doppler signal is preferably coupled to one input (preferably the non-inverting input) of the comparator and a reference signal is coupled to the other input (preferably the inverting input) of the comparator. When the Doppler signal level exceeds the predefined reference signal level, the comparator output will change state or "trip," thereby indicating the presence of a moving body within the protection zone of the sensor.

The reference signal, to which the Doppler signal is compared, may be generated from a fixed voltage or current source and is preferably adjustable by the user. Alternatively, the Doppler signal may be scaled (either amplified or attenuated) before being presented to the level detector 30. This latter approach may be necessary, for example, if the reference signal source is not adjustable or if the desired reference value is unavailable within the circuit. In either case, by varying the point at which the level detector 30 trips, the user is preferably able to control the sensitivity of the sensor as desired for the particular application or environment in which the sensor is employed. This may be particularly useful for avoiding false detections by the sensor.

Figure 3:
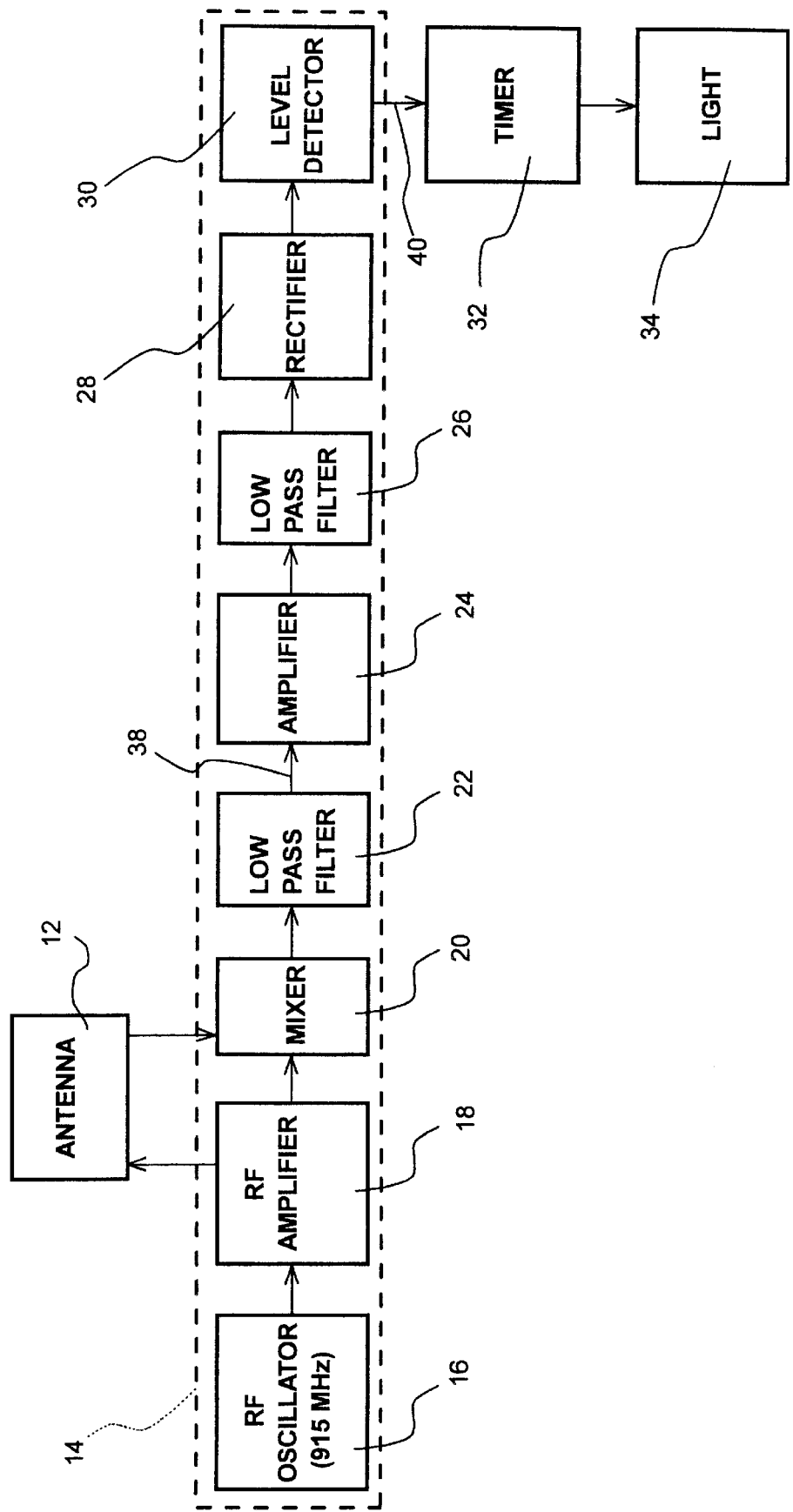
FIG. 3 is a block diagram of an alternate embodiment of a Doppler detection circuit, formed in accordance with the present invention.

An alternative embodiment of the present invention is shown in FIG. 3. Referring now to FIG. 3, the RF signal generated by the signal generator 16 is preferably passed through a RF amplifier 18 before being fed to the antenna 12. The RF amplifier 18 preferably provides electrical impedance matching and isolation between the signal generator 16 and the antenna 12. This isolation will increase the frequency stability of the circuit, which is directly proportional to the "que" (Q) of the circuit. It is therefore especially important to provide isolation if the signal generator 16 employs a low-Q oscillator. Without such isolation, the resulting RF signal frequency may be adversely modulated by the reflected signal received from the antenna 12. Additionally, the RF amplifier 18 preferably provides gain for the RF signal which is propagated by the antenna 12, thereby expanding the protection range of the sensor. The gain of the amplifier may therefore be chosen to define a desired sensor protection region.

Since the Doppler signal level produced at the output of the low pass filter 22 is typically very small in amplitude, this signal may preferably be passed through a general purpose low frequency (LF) amplifier 24, operatively coupled to the output of the low pass filter 22, before being fed to the level detector 30. It is to be appreciated that suitable LF amplifiers for use in the present invention are well known in the art and include single- or multi-stage amplifiers employing transistors, op amps, or the like. If greater gain is required, one or more additional LF amplifier stages may be connected, preferably in a cascade (series) configuration, to the output of LF amplifier 24. Unlike the RF amplifier 18, the LF amplifier 24 need only be capable of amplifying very low frequency signals (typically less than 100 Hz), since the high frequency components of the Doppler signal are substantially attenuated by the low pass filter 22. This greatly reduces the costs associated with the design and manufacture of the LF amplifier 24.

The Doppler signal present at the output of the LF amplifier 24 may be further processed as necessary, such as by filtering and/or rectification, before being presented to the level detector 30. Preferably, the amplified Doppler signal may be passed through at least a second low pass filter stage 26, operatively coupled to the output of the LF amplifier 24. This additional low pass filter stage helps to substantially remove any high frequency components still present in the Doppler signal. Additionally, the Doppler signal may be rectified by rectifier 28, preferably connected between the second low pass filter 26 and the level detector 30. Using standard rectification techniques known by those skilled in the art, rectifier 28 substantially removes the alternating current (AC) component of the Doppler signal before being fed to the level detector 30. These additional stages of signal processing preferably allow the level detector 30 to more accurately discriminate between the Doppler signal and mere noise, thus increasing the overall sensitivity of the sensor (primarily by increasing the signal-to-noise ratio).

In a preferred embodiment of the present invention, the rectification function may be realized as an active rectifier circuit including an operational amplifier and at least one diode. One drawback to using a conventional diode rectifier circuit is that the rectification is not precise; the forward voltage drop in the diode introduces an offset between zero and about 0.6 volts. For applications involving relatively low-voltage signals (e.g., around 1 to 3 volts), the offset error in the output waveform is generally unacceptable. Accordingly, the performance of the rectifier can be greatly enhanced by the addition of active circuit elements (e.g., operational amplifiers).

Another important component of the protection sensor which will now be discussed is the antenna. The type of antenna employed will substantially affect the shape of the antenna radiation pattern, which in turn defines the boundary of the sensor protection region. Preferably, a single antenna is used for both transmitting the RF signal and for receiving the reflected signal from a conducting body within the protection region of the sensor. The present invention, however, contemplates using separate transmit and receive antennas respectively.

Since the antenna 12 is preferably mounted to the back of the vehicle 11 (as illustrated in FIG. 1), it is important to employ an antenna which provides a substantially unidirectional radiation pattern, preferably hemispherical. Without a unidirectional radiation pattern, the driver and vehicle would adversely affect the sensor, by producing false detections for example. Accordingly, an equiangular spiral antenna may be used. The spiral antenna is well-suited and meets the preferred design criteria of the present invention, including wide bandwidth operation, unidirectional radiation pattern, flush mounting and compact size (substantially flat). A brief discussion of the spiral antenna is provided below.

Spiral Antenna

In general, the spiral antenna was proposed as a solution to the problem of operating an antenna over a broad range of frequencies and/or a wide angle of sensitivity. Since the spiral antenna was introduced by Edwin M. Turner in 1954, various literature has been published on the subject. Such articles include B. R.-S. Cheo, et al., "A Solution to the Frequency-Independent Antenna Problem," IRE Transactions on Antennas and Propagation, Nov. 1961; Johnson J. H. Wang and Victor K. Tripp, "Design of Multioctave Spiral-Mode Microstrip Antennas," IEEE Transactions on Antennas and Propagation, Vol. 39, No. 3, Mar. 1991; and John D. Dyson, "The Equiangular Spiral Antenna," IRE Transactions on Antennas and Propagation, Apr. 11, 1959, which are incorporated herein by reference. The above-referenced literature provide a detailed study on the theory and operation of spiral antennas, and therefore an in-depth discussion of spiral antennas will not be presented here.

Figure 4:
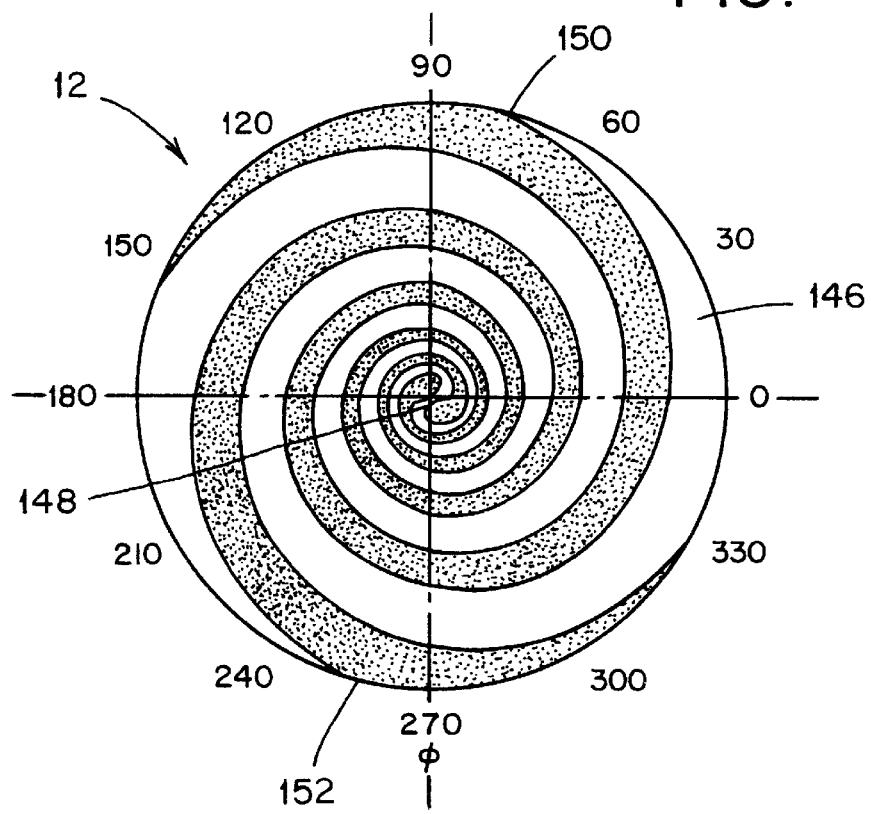
FIG. 4 is a top plan view of a cavity-backed spiral antenna formed in accordance with the present invention.

One embodiment of the spiral antenna for use with the present invention is a two-element (two-arm) spiral antenna, illustrated generally in FIG. 4. Referring now to FIG. 4, each element of the antenna 150 and 152 basically consists of an open transmission line coiled around the center 148 in a spiral configuration. The equiangular or logarithmic spiral is preferably a planar curve which may be defined by the equation $$\rho = k e^{a\Phi}$$

where $\rho$ and $\Phi$ are conventional polar coordinates and k and a are positive constants. It is preferred that the spiral elements 150, 152 are mounted on a dielectric support 146, preferably a printed circuit board. Alternatively, other dielectric materials may be used to support the spiral elements, such as glass or plastic, or the spiral elements may be suspended in free air, without being supported on a dielectric substrate. It is additionally preferred that the two spiral elements 150, 152 are shifted 180° from each other.

To obtain performance essentially independent of frequency, the circumference of the antenna 12 does not need to be large compared to a wavelength, and in fact need only be comparable to one wavelength at the lowest frequency of operation. For example, the circumference of the antenna 12 should preferably be about one meter if the lowest frequency of operation is about 300 MHZ ($\lambda$=f/c, where c=velocity of light, or $3\times10^8$ m/s). A more detailed discussion of spiral antennas is presented in the text *Antenna Engineering Handbook*, by Richard C. Johnson, which is incorporated herein by reference.

Figure 5:
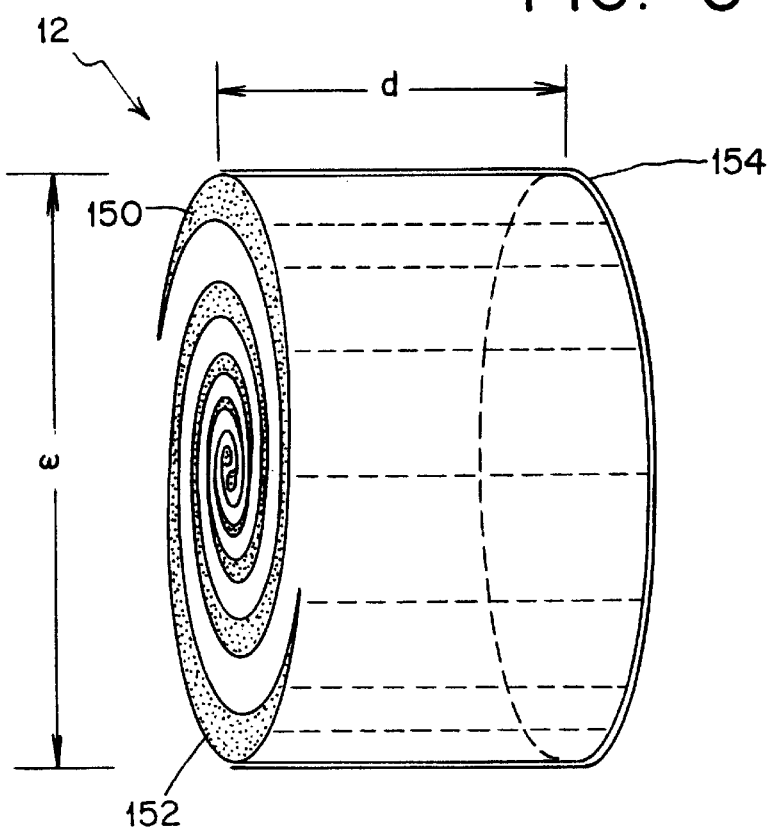
FIG. 5 is a side perspective view of the cavity-backed spiral antenna depicted in FIG. 4.

The radiation pattern of a basic planar spiral antenna is substantially bidirectional, with symmetrical beams radiating from the front and back of the antenna structure, perpendicular to the plane of the antenna. In most practical applications, however, there is virtually no need for a spiral antenna radiating on both sides of the spiral plane. In fact, in most applications requiring flush mounting of the spiral antenna, the bidirectional radiation pattern is undesirable. To overcome this problem, a conductive cavity may preferably be placed on one side of the spiral antenna to absorb the undesired radiation in that direction; otherwise, the undesired radiation on the cavity side may adversely interfere with the desired radiation pattern on the other side. A typical cavity-backed spiral antenna 12 is shown in FIG. 5. The cavity 154 may preferably be formed from virtually any rigid material having a high electrical conductivity, such as copper, although other suitable materials are contemplated. This cavity-backed spiral antenna 12 is well-suited for use in the present invention and is preferred.

The dimensions of the cavity 154 will have a considerable effect on the performance of the spiral antenna 12. Preferably, the diameter of the cavity 154 is chosen to be substantially equal to the diameter of the spirals (w). If the cavity diameter is made too small, the spiral antenna 12 will exhibit reduced gain and an increased voltage standing wave ratio (VSWR); if the cavity diameter is made too large, antenna pattern distortion may occur primarily due to higher order mode excitation of the cavity 154. Furthermore, the depth of the cavity d will affect the gain of the spiral antenna 12. As described in the literature referenced above, the gain of the spiral antenna gradually increases to a maximum when the cavity 154 is about one quarter wavelength in depth (d=$\lambda$/4) and thereafter diminishes to a minimum at a cavity depth of about one half wavelength (d=$\lambda$/2). In a preferred embodiment of the present invention, the depth d of the cavity 154 is chosen to be about 0.15$\lambda$. This depth was found to produce acceptable gain in a generally compact size.

The antenna 12 is preferably driven from the center of the spirals by a balun circuit. It is to be appreciated that substantially any and all balun circuits that might be used to drive a dipole antenna or a two-wire transmission line can be similarly used with a spiral antenna, and such baluns are well known in the art. A common method of exciting the spiral antenna is from a small section of a rigid coaxial transmission line extending over the surface of the antenna. The center conductor of the transmission line is preferably electrically connected to one of the spiral elements and the outer conductor (shield) is connected to the other spiral element.

In one embodiment of the present invention, the cavity-backed spiral antenna 12 includes two spiral elements. As shown in FIG. 4, both spiral elements 150 and 152 are preferably wound around the center 148 exponentially to have at least about 1.5 turns, although for good efficiency about 2.5 turns is preferred. The width of the two spiral elements 150, 152 preferably increases with increasing radius. As discussed above, for the antenna 12 to obtain essentially frequency-independent performance, the circumference of the spiral elements 150, 152 should preferably be about one half meter (50 cm) if the lowest frequency of operation is about 600 MHZ. This translates to a preferred spiral diameter w of about six inches (w=c/$\pi$, where c is the circumference of the spiral).

Referring to FIG. 5, the spiral antenna 12 is preferably formed having a cavity 154 which is electrically isolated from the spiral elements 150, 152 (i.e., the cavity 154 is electrically floating). The cavity 154 is preferably formed as a copper cylinder with a diameter substantially equal to the spiral diameter (w) of about six inches and having a cavity depth (d) of about four inches. This cavity depth corresponds to about 0.15$\lambda$ at the lowest anticipated frequency of operation (about 450 MHZ), which was found to provide acceptable gain as discussed above. Although an antenna having other dimensions (or shapes) is contemplated, these dimensions provide a substantially unidirectional antenna with a usable bandwidth of about 450 MHZ to about 1.5 GHz. However, it is to be appreciated by one skilled in the art that the dimensions and shape of the spiral antenna may be varied to correspond to a desired antenna radiation pattern or usable frequency bandwidth.

The embodiment of the spiral antenna shown in FIGS. 4 and 5 is preferably fed (excited) by an infinite balun circuit. The infinite balun is known in the art and is preferred because of its simplicity and excellent performance. Preferably, the infinite balun is formed from a coaxial transmission line which follows the curve of one spiral element. The outer conductor of the coaxial transmission line is preferably electrically connected to this spiral element, such as by soldering, and the center conductor of the coaxial line is electrically connected to the center point of the other spiral element in a similar fashion.

In a preferred embodiment of the present invention, a patch antenna is alternatively employed in place of the spiral antenna previously described herein. One such patch antenna for use with the present invention is a Cushcraft model S9026PL, or equivalent. Although a patch antenna generally has a field of view which is slightly less than that of a spiral antenna, the patch antenna offers a significant advantage in that it can be fabricated directly on a printed circuit board, thereby reducing the size and cost of the antenna, and is therefore preferred. Additionally, a wide bandwidth antenna is not absolutely critical to the present invention, since the Doppler detection circuit preferably operates in a continuous wave mode of transmission. Therefore, wideband performance becomes less important than other design criteria, such as manufacturability, size and cost.

The physical dimensions of the patch antenna will determine the field of view and range of the antenna. Generally, the length and width of the antenna can be altered to narrow or widen the field of view, either horizontally or vertically, as desired. A longer horizontal dimension typically results in a more narrow aperture. The size (area) of the patch determines the power (range) of the antenna. Additionally, the point of connection to the patch may preferably be adjusted to obtain proper impedance matching with the circuit to which the patch antenna is coupled.

Figure 6B:
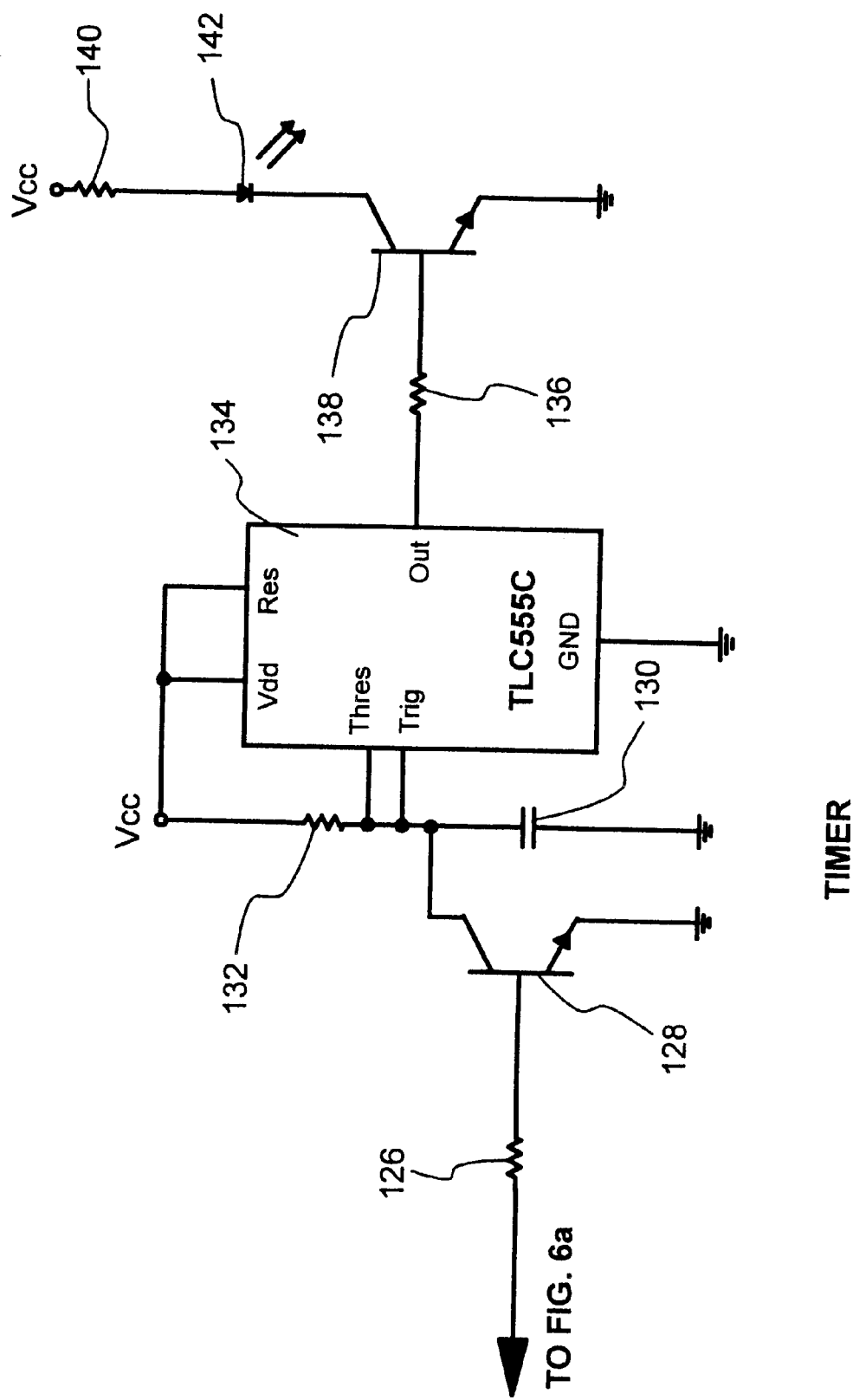

An exemplary Doppler detection circuit, formed in accordance with the present invention, is illustrated in the electrical schematic diagram of FIGS. 6A and 6B. The circuit includes a signal generator, preferably realized as a negative resistance reflection oscillator operating in the radio frequency (RF) spectrum (preferably about 915 MHZ). The oscillator includes a transistor 50, biased at a stable DC quiescent operating point with bias resistors 46, 48 and 52. In a preferred biasing arrangement, collector bias resistor 46 is connected between the collector of transistor 50 and the positive voltage supply ($V_{cc}$), emitter bias resistor 52 is connected between the emitter of transistor 50 and the negative voltage supply (Ground), and bias resistor 48 is connected between the base and collector of transistor 50. A decoupling capacitor 44 may also be connected in parallel across collector bias resistor 46 to provide high-frequency stability of the oscillator circuit.

A microstrip line 54, coupled to the base of transistor 50, acts as a resonator for the oscillator (negative resistor element). Preferably, microstrip line 54 is formed on the circuit board and is cut to be a half wavelength (electrically) at 915 MHZ, given the particular dielectric characteristics of the circuit board. This length enables the oscillator to operate at a frequency of about 915 MHZ.

The gain of the oscillator may preferably be increased by using an emitter bypass capacitor connected in parallel with emitter bias resistor 52. When using a multilayer circuit board, with at least one layer preferably connected to a ground plane, the emitter bypass capacitor may alternatively be formed on the circuit board as a pad 42 of conductive material, preferably copper. The conductive pad 42, formed at the junction between the emitter of transistor 50 and the emitter bias resistor 52, preferably creates a parallel plate capacitor with respect to the ground plane (AC ground). In this manner, component count may be reduced. The required dimensions of the pad 42 will change depending upon the frequency of the oscillator and the dielectric characteristics of the circuit board. For the present invention, operating at a frequency of about 915 MHZ, the pad 42 will typically be on the order of one square centimeter (1 cm$^2$).

The RF signal generated by the oscillator is preferably tapped off the microstrip line 54 and is fed to an amplifier 58 via a coupling capacitor 56. The value of coupling capacitor 56 is selected to allow signals at or above a desired cutoff frequency to pass, substantially unattenuated, while effectively rejecting signals below the desired cutoff frequency. Preferably, the microstrip line 54 is tapped at a point where suitable impedance matching between the oscillator and the amplifier 58 is achieved. For the amplifier 58 shown in FIGS. 6A and 6B show (Mini-Circuits No. MAR-06, or equivalent), an open-collector output stage is employed, which provides only current sinking ability. Therefore, a pull-up resistor 60 is required to supply the source current for positive voltage swings of the RF signal. It is to be appreciated, however, that if an amplifier is used having an output stage capable of both sinking and sourcing current, for example a push-pull output stage, pull-up resistor 60 may be omitted.

Although amplifier 58 is shown configured as a unity gain amplifier, the present invention contemplates utilizing an amplifier having a gain greater than one. Moreover, one or more amplifier stages may be connected in cascade between the amplifier 58 and the antenna 12. In this manner, the circuit may provide amplification of the RF signal as well as isolation, which may be desirable or even necessary in certain applications (for example, extended range applications).

The output of amplifier 58 is preferably directly coupled to the anode of a RF diode 62 which functions as the mixer, thereby producing an IF signal. The antenna 12 is connected at the junction between the RF diode 62 and the output of amplifier 58. In this preferred embodiment, the antenna 12 is used both to radiate the RF signal generated by the oscillator and to receive a reflected signal from a conducting body within the protection region of the sensor. As an alternative embodiment, it is contemplated that separate antennas may be utilized for transmitting and receiving. When using this multi-antenna approach, however, a change in received power, and not a Doppler signal, will indicate the presence of a life form within the sensor detection zone.

The IF signal produced at the cathode of the RF diode 62 is preferably filtered by a low pass filter network including capacitor 68 and resistor 66 connected in a parallel shunt configuration between the cathode of the RF diode 62 and the negative voltage supply. The low pass filter stage substantially attenuates the high frequency sum component of the IF signal, effectively allowing only the low frequency Doppler signal 38 to pass. The value of capacitor 68 and resistor 66 are preferably selected to have a pole at about 35 Hz. A low pass filter having a single-pole roll-off should generally be sufficient to extract the Doppler signal from the IF signal. However, since capacitor 68 must be substantially large to produce a pole at such a low frequency, it is preferable to include an additional capacitor 64, connected in parallel with capacitor 68, to provide a high frequency pole. This technique is often used when large capacitors are employed since large value capacitors typically exhibit poor high frequency performance.

After attenuating the high frequency components of the IF signal, the Doppler signal 38 is preferably fed to a general purpose pre-amplifier via a coupling capacitor 70 which is sufficiently large enough to pass the low frequency Doppler signal 38. The pre-amplifier circuit preferably includes a transistor 76, in a collector feedback configuration, biased at a stable DC operating point with bias resistors 72 and 74. Base resistor 72 is preferably connected in feedback between the base and collector of transistor 76 and collector bias resistor 74 is preferably connected between the collector of transistor 76 and the positive voltage supply. The emitter of transistor 76 is connected to the negative supply.

Preferably, the signal produced at the output of the pre-amplifier (i.e., at the collector of transistor 76) is further processed by subsequent amplification, filtering and rectification stages which are coupled, preferably in series, to the pre-amplifier output. As shown in FIGS. 6A–6B, the pre-amplifier output signal is applied to an amplifier circuit through coupling capacitor 78. This amplifier circuit preferably includes an operational amplifier 88 configured as an inverting amplifier with gain-setting resistors 80 and 82. As appreciated by one skilled in the art, resistor 80 is connected in series between the inverting input of operational amplifier 88 and coupling capacitor 78, and resistor 82 is connected in feedback across operational amplifier 88 to establish the gain of the amplifier. Preferably, the gain of the amplifier is set to be about 100.

In order to obtain the maximum output voltage swing from the amplifier stage without clipping (i.e. distorting) the output waveform, the common mode voltage of the operational amplifier 88 is preferably set to a fixed DC voltage which is halfway between the positive and negative voltage supplies (e.g., $V_{cc}/2$). This common mode voltage, preferably established at the non-inverting input of operational amplifier 88, may be generated by a resistor voltage divider network including two series-connected resistors 84 and 86 which are connected between the positive and negative voltage supplies. The non-inverting input of the operational amplifier 88 is therefore connected to the junction of resistors 84 and 86, which are preferably of equal value thereby setting the DC common mode voltage of the operational amplifier 88 to be about mid-supply.

The amplified Doppler signal generated at the output of operational amplifier 88 is preferably directly coupled to an active low pass filter circuit including an operational amplifier 100, resistors 90, 94 and 96, and capacitors 92 and 98. The LP filter circuit is preferably a second-order (2-pole) filter having a cutoff frequency of about 10 Hz. The amplified Doppler signal is fed through two series-connected resistors 90 and 94 which are connected between the inverting input of operational amplifier 100 and the output of operational amplifier 88. Resistor 96 is connected between the junction of resistors 90 and 94 and the output of operational amplifier 100, shunt capacitor 92 is connected between the junction of resistors 90 and 94 and the negative voltage supply, and capacitor 98 is connected in feedback between the inverting input and the output of operational amplifier 100. The common mode point of the LP filter is preferably set to be the same as the previous stage by connecting the non-inverting input of the operational amplifier 100 to the junction of resistors 84 and 86. Using the same common mode voltage between direct-coupled stages reduces the amount of DC offset introduced into the signal path and is therefore preferred.

The signal at the output of the LP filter stage may be attenuated by a shunt resistor 102 connected between the output of operational amplifier 100 and the negative voltage supply. This attenuation may be necessary to limit the amplified Doppler signal level before being rectified. The rectification stage is preferably implemented as an active precision full-wave rectifier circuit. A discussion of the advantages of using an active rectifier circuit, rather than a conventional rectifier circuit, has been previously provided. The active rectifier circuit preferably includes an operational amplifier 108, two diodes 110 and 112, and two resistors 104 and 106. The signal present at the output of operational amplifier 100 is directly connected to the inverting input of operational amplifier 108 via series resistor 104. Resistor 106 is connected between the anode of diode 112 and the inverting input of operational amplifier 108. Diodes 110 and 112 are connected together in series, with the cathode of diode 112 connected to the anode of diode 110. The cathode of diode 110 is connected to the inverting input of operational amplifier 108 and the output of operational amplifier 108 is connected to the junction of diodes 110 and 112. The common mode voltage for the operational amplifier 108 is set by connecting the non-inverting input of operational amplifier 108 to the junction of resistors 84 and 86, thereby preferably fixing the DC operating point of the operational amplifier 108 at about mid-supply (i.e., $V_{cc}/2$).

The output of the LP filter stage (at the output of operational amplifier 100) and the output of the rectifier stage (at the anode of diode 112) is passed through a voltage adder-multiplier stage. The adder-multiplier circuit includes an operational amplifier 118 and resistors 114, 116 and 120, configured to perform an addition of two scaled analog inputs. The output of the LP filter circuit is fed to the inverting input of operational amplifier 118 via series-connected resistor 114. Likewise, the output of the rectifier circuit is fed to the inverting input of operational amplifier 118 via series-connected resistor 116. Resistor 120 is connected in feedback between the inverting input and the output of operational amplifier 118. With this circuit arrangement, the output of the rectifier circuit is preferably multiplied by a gain of two and added to the output of the LP filter circuit, which is preferably not scaled. Since the signals are summed at the inverting input of the operational amplifier 118, the magnitude of the resulting output signal will be inverted.

The output of the adder-multiplier circuit is subsequently fed to a comparator circuit 122 (or alternatively, to an operational amplifier) which functions as a level detector. The reference voltage for the comparator circuit is preferably generated by a resistor voltage divider 124 connected between the positive and negative voltage supplies. Preferably, the resistor divider 124 takes the form of a potentiometer having to a wiper (i.e., variable resistance) terminal connected to one input of the comparator 122. This preferably allows the trip point of the comparator to be adjusted for a desired sensitivity level. The signal generated at the output of the comparator 122 is preferably indicative of the presence or absence of a moving body within the detection region of the sensor and is therefore defined as the sensor output signal 40.

Preferably, the sensor output signal 40 is fed to a timer circuit 134. A suitable timer circuit 134 can be formed in a manner known in the art such as by using a TLC555C (or equivalent) integrated circuit in combination with timing resistor 132 and capacitor 130 as illustrated. Before being connected to the timer circuit 134, however, the polarity of the sensor output signal 40 may first have to be inverted in order to correspond to the appropriate edge detection (i.e., rising or falling edge detection) of the timer circuit 134. This inversion may be accomplished by including an inverter circuit in series connection between the output of the comparator 122 and the timer circuit 134. The inverter may preferably include a transistor 128 and a series-connected base resistor 126 used to limit the current into the base of transistor 128. The collector of transistor 128 is then used to trigger the timer circuit 134 by pulling an input terminal of the timer circuit 134 low (i.e., to the negative voltage supply) when the sensor output signal 40 indicates the presence of a moving body in the detection zone of the sensor. An output signal from the timer circuit 134, which is indicative of the presence of a moving body, is presented on an output terminal of the timer circuit 134.

Preferably, an alarm indicator is operatively coupled to the output terminal of the timer circuit 134 to provide sensory indication (e.g., visual or audible) that a target has been detected by the detector unit 14. Such an indicator may be formed as a visual alarm circuit including a transistor 138 to drive a light-emitting diode (LED) 142 connected in series between the collector of transistor 138 and the positive voltage supply through a current limiting resistor 140. An additional current limiting resistor 136 may also be connected in series between the base of the transistor 138 and the output terminal of the timer 134.

Table 1, shown on the following page, illustrates values of the previously identified components used in an illustrative embodiment of the present invention. With these exemplary component values, the positive voltage supply is defined to be +9 volts DC and the negative voltage supply is defined to be 0 volts DC (i.e., ground potential).

Figure 7:
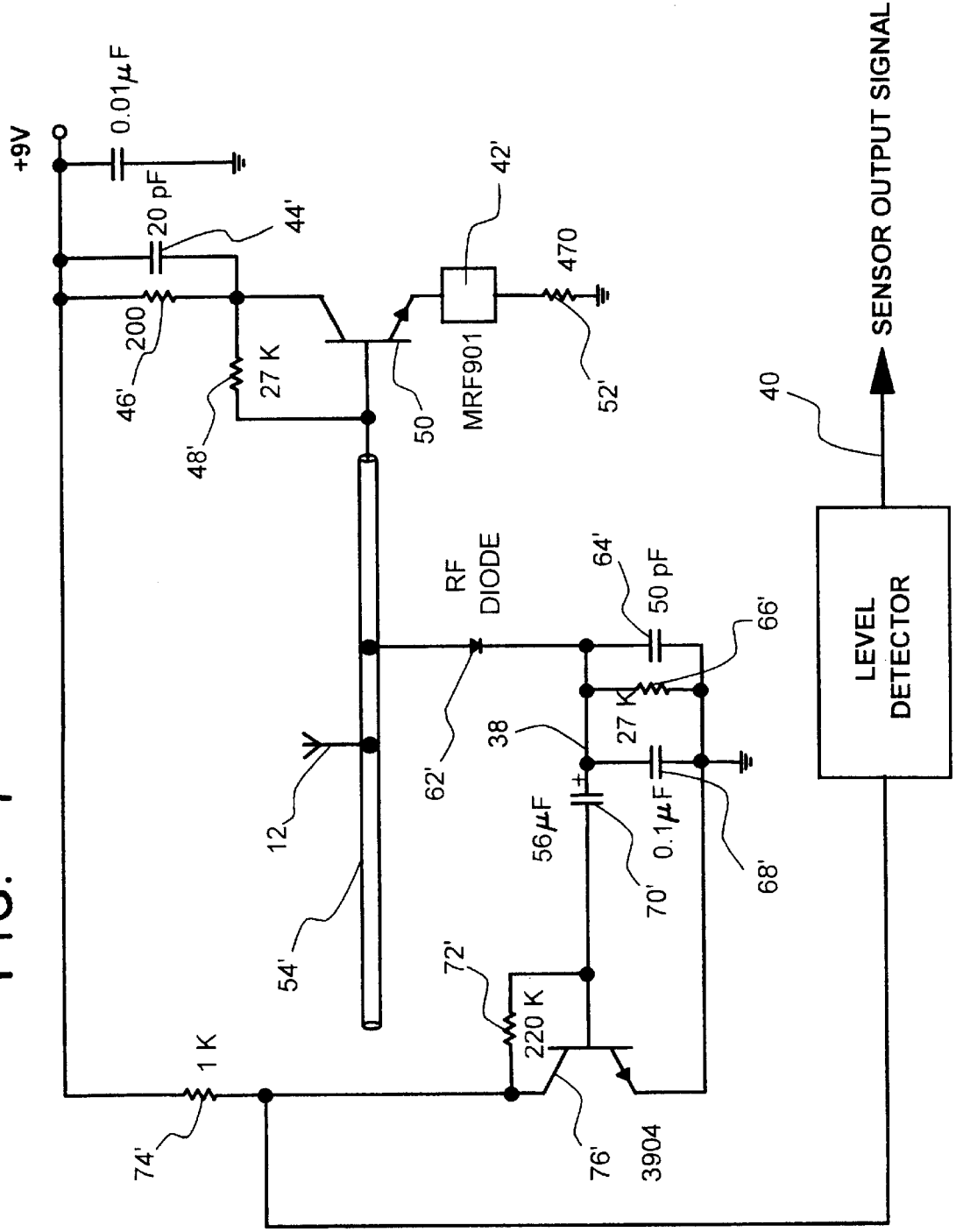
FIG. 7 is an electrical schematic diagram of an alternate embodiment of a Doppler detection circuit, formed in accordance with the present invention and depicted by the block diagram of FIG. 2.

FIG. 7 is an electrical schematic diagram which illustrates a simplified Doppler circuit formed in accordance with the present invention. Corresponding components have been designated with corresponding, but primed, reference designations and share the same component values as the non-primed reference designations listed in Table 1. The simplified Doppler circuit of FIG. 7 may be used to generate a Doppler signal 38. This circuit omits the buffer amplifier and related components shown in the exemplary circuit of FIGS. 6A–6B. The Doppler output signal produced at the collector of transistor 76' may be presented to a level detector, as illustrated in the block diagram of FIG. 2 and described above, to generate a sensor output signal indicative of the presence of a moving body within the detection zone of the sensor.

TABLE 1

| Reference Designation | Type | Value |
|---|---|---|
| 42 | Copper Pad | 13.23 mm × 7.7 mm |
| 44 | Cap. | 20 pF |
| 46 | Res. | 200 Ω |
| 48 | Res. | 27 KΩ |
| 50 | BJT | MRF901 |
| 52 | Res. | 470 Ω |
| 54 | Microstrip | 58.6 mm × 2.0 mm |
| 56 | Cap. | 1.0 nF |
| 58 | Buffer | MAR-06 |
| 60 | Res. | 330 Ω |
| 62 | Diode | RF Type |
| 64 | Cap. | 50 pF |
| 66 | Res. | 47 KΩ |
| 68 | Cap. | 0.1 μF |
| 70 | Cap. | 56 μF |
| 72 | Res. | 220 KΩ |
| 74 | Res. | 1 KΩ |
| 76 | BJT | 2N3904 |
| 78 | Cap. | 0.1 μF |
| 80 | Res. | 100 KΩ |
| 82 | Res. | 10 MΩ |
| 84 | Res. | 200 KΩ |
| 86 | Res. | 200 KΩ |
| 88 | OP AMP | MC34072 |
| 90 | Res. | 27.4 KΩ |
| 92 | Cap. | 2.2 μf |
| 94 | Res. | 76.8 KΩ |
| 96 | Res. | 24.9 KΩ |
| 98 | Cap. | 0.1 μF |
| 100 | OP AMP | MC34072 |
| 102 | Res. | 2 KΩ |
| 104 | Res. | 10 KΩ |
| 106 | Res. | 10 KΩ |
| 108 | OP AMP | MC34072 |
| 110 | Diode | 1N4148 |
| 112 | Diode | 1N4148 |
| 114 | Res. | 20 KΩ |
| 116 | Res. | 10 KΩ |
| 118 | OP AMP | MC34072 |
| 120 | Res. | 20 KΩ |
| 122 | OP AMP | MC34072 |
| 124 | Variable Res. | 10 KΩ |
| 126 | Res. | 10 KΩ |
| 128 | BJT | 2N3904 |
| 130 | Cap. | 0.33 μF |
| 132 | Res. | 2 MΩ |
| 134 | Timer | TLC555C |
| 136 | Res. | 10 KΩ |
| 138 | BJT | 2N3904 |
| 140 | Res. | 300 Ω |
| 142 | LED | Panasonic LN28RP |

FIG. 8 is a block diagram illustrating a vehicle 12 interfaced to a protection sensor 10 formed in accordance with the present invention. Suitable vehicles for use with the present invention include, but are not limited to, lawn tractors and related farm implements. The Doppler detection circuit 14, regardless of the specific embodiment selected, generates an output signal 40 which is indicative of the presence of a moving body within the detection zone of the sensor. This output signal 40 can directly drive a sensory warning system, as previously described. In addition, the output signal 40 from the detection circuit 14 can be provided to a vehicle systems processor 160 which interfaces to selected vehicle working machinery to alter the operation of one or more vehicle functions. Vehicle working machinery may preferably include, for example, lawn cutting attachments, soil cultivating and boring attachments, or similar components which can inflict serious bodily harm if accidentally contacted by humans or animals.

As an example, the vehicle systems processor 160 can provide a signal to a lawn mower blade disabling system 162 on a tractor, stopping the motion of the cutting blade when a moving body is detected. Similarly, the vehicle systems processor 160 can control an automatic braking system (ABS) 164 and/or engine disable system 166 to prevent further motion of the vehicle toward a detected body. Methods for disabling such vehicle operations are well known by those skilled in the art. In addition, an enhanced driver warning system 168 employing audible, visual and/or tactile indications, such as vibration in the driver's seat or steering mechanism, can also be activated by the vehicle systems processor 160. In this manner, a protection sensor 10 of the present invention can alter the operation of a vehicle to avoid impacting a moving body in the detection zone of the sensor.

It is to be appreciated that since an operator's vision is generally most restricted while operating a vehicle in the reverse direction, specific reference has been made to a sensor providing back-up vehicle protection. The present invention, however, contemplates mounting the protection sensor of the present invention to the vehicle in such a manner as to similarly establish detection regions in other directions. For example, it may be desirable to mount the protection sensor 10 on the front or sides of the vehicle to provide an enhanced protection zone. Additionally, multiple sensors may be employed on a vehicle. It is further contemplated that a sensor may be selectively enabled or disabled, depending upon the direction in which the vehicle is moving. For example, a sensor mounted to the rear of the vehicle may preferably be disabled when the vehicle is moving in a forward direction, thereby reducing the likelihood of false indications.

A protection sensor formed in accordance with the present invention provides enhanced protection for a vehicle. The present invention provides a sensor which can discriminate between conducting and non-conducting objects that are in relative motion with respect to the sensor. Additionally, the present invention provides a sensor which is immune from false detections generated by thermal "hot spots" on the lawn. By using a Doppler detection circuit, the relative motion of a body is established by detecting a frequency shift between a transmitted radio frequency signal and a received signal reflected off the moving body within a region to be protected. Moreover, false detections of the vehicle and/or operator are greatly reduced by employing a substantially unidirectional antenna operatively coupled to the Doppler detection circuit.

Although illustrative embodiments of the present invention have been described herein with reference to the accompanying drawings, it is to be understood that the invention is not limited to those precise embodiments, and that various other changes and modifications may be effected therein by one skilled in the art without departing from the scope or spirit of the present invention.

What is claimed is:

1. A back-up protection sensor for a vehicle having working machinery, the sensor comprising:

a substantially unidirectional antenna;

a Doppler detection unit operatively coupled to the antenna, the detection unit generating a radio frequency signal of from about 450 MHZ to about 1.5 GHZ, the antenna radiating the radio frequency signal and receiving a signal reflected from a conductive body in relative motion with respect to the sensor, the conductive body being within a predetermined detection region, the detection unit further generating a sensor output signal responsive to a difference in frequency between the radio frequency signal and the reflected signal; and a vehicle interface processor, the interface processor being responsive to the sensor output signal and providing a control signal to disable the operation of the working machinery upon the sensing of the conductive body in relative motion with respect to the vehicle.

2. A back-up protection sensor for a vehicle as defined by claim 1, wherein the antenna produces a substantially hemispherical radiation pattern.

3. A back-up protection sensor for a vehicle as defined by claim 2, wherein the antenna is a cavity-backed spiral antenna.

4. A back-up protection sensor for a vehicle as defined by claim 2, wherein the antenna is a patch antenna.

5. A back-up protection sensor for a vehicle as defined by claim 1, further comprising a driver warning system, the warning system being responsive to the output signal from the detection unit and providing an indication that an object in relative motion with respect to the sensor has been detected within the detection region of the sensor.

6. A back-up protection sensor for a vehicle having working machinery, the sensor comprising:

a signal generator for generating a radio frequency signal of from about 450 MHZ to about 1.5 GHZ;

a substantially unidirectional antenna operatively coupled to the signal generator, the antenna radiating the radio frequency signal and receiving reflections of the radio frequency signal off a conductive body, in relative motion with respect to the sensor, located within a predetermined detection region;

a mixer, operatively coupled to the antenna and to the signal generator, the mixer combining at least a portion of the radio frequency signal from the generator with the reflected signal received from the antenna and generating an intermediate frequency signal including a sum component and a difference component corresponding to the addition and subtraction of the radio frequency signal and reflected signal respectively;

a low pass filter operatively coupled to the mixer, the low pass filter substantially removing the sum component from the intermediate frequency signal, thereby producing a Doppler signal;

a level detector operatively coupled to the low pass filter, the level detector comparing the Doppler signal with a predetermined reference signal and generating a sensor output signal indicative of the presence of the conductive body in relative motion with respect to the sensor, the conductive body being within the detection region of the sensor; and a vehicle interface processor, the interface processor being responsive to the sensor output signal and providing a control signal, said control signal disabling the working machinery when the conductive body in relative motion with respect to the sensor is detected.

7. A back-up protection sensor for a vehicle as defined by claim 6, further comprising a driver warning system, the warning system being responsive to the sensor output signal and providing an indication that the object in relative motion with respect to the sensor has been detected within the detection region of the sensor.

8. A method for detecting a conductive body near a vehicle having working machinery, the conductive body being in relative motion with respect to the vehicle, the method comprising the steps of:

generating a radio frequency signal of from about 450 MHZ to about 1.5 GHZ;

radiating the radio frequency signal in a substantially hemispherical radiation pattern;

receiving a reflection of the radio frequency signal, the reflection being reflected from the conductive body in a predetermined detection region;

combining at least a portion of the radio frequency signal with the received reflection and generating an intermediate frequency signal having at least a sum component and a difference component corresponding to the addition and subtraction of the radio frequency signal and the reflection respectively;

filtering the intermediate frequency signal to substantially remove the sum component, thereby generating a Doppler signal;

comparing the Doppler signal with a predetermined reference signal and generating a sensor output signal when the Doppler signal level exceeds the reference signal level, the sensor output signal indicating of the presence of the conductive body within the detection region of the sensor; and providing a control signal responsive to the sensor output signal, said control signal disabling the working machinery of the vehicle.

9. A method for detecting an object near a vehicle as defined by claim 8, the method further comprising the step of generating a control signal, the control signal being responsive to the sensor output signal and altering the operation of the vehicle.

10. A lawn vehicle, including a lawn cutting attachment in combination with a back-up protection sensor, the back-up protection sensor comprising:

a signal generator for generating a radio frequency signal;

a substantially unidirectional antenna operatively coupled to the signal generator, the antenna radiating the radio frequency signal and receiving reflections of the radio frequency signal off an object, in relative motion with respect to the sensor, located within a predetermined detection region;

a mixer, operatively coupled to the antenna and to the signal generator, the mixer combining at least a portion of the radio frequency signal from the generator with the reflected signal received from the antenna and generating an intermediate frequency signal including a sum component and a difference component corresponding to the addition and subtraction of the radio frequency signal and reflected signal respectively;

a low pass filter operatively coupled to the mixer, the low pass filter substantially removing the sum component from the intermediate frequency signal, thereby producing a Doppler signal;

a level detector operatively coupled to the low pass filter, the level detector comparing the Doppler signal with a predetermined reference signal and generating a sensor output signal indicative of the presence of the object in relative motion with respect to the sensor, the object being within the detection region of the sensor;

a driver warning system, the driver warning system being responsive to the sensor output signal and providing an indication that the object in relative motion with respect to the sensor has been detected;

a vehicle interface processor, the interface processor being responsive to the sensor output signal and providing a control signal; and wherein the control signal disables the lawn cutting attachment when the object in relative motion with respect to the sensor is detected.

11. A lawn vehicle in combination with a back-up protection sensor as defined by claim 10, wherein the lawn vehicle includes an engine responsive to the control signal, the control signal disabling the engine when the object in relative motion with respect to the sensor is detected.

12. A lawn vehicle in combination with a back-up protection sensor as defined by claim 10, wherein the lawn vehicle includes a braking system responsive to the control signal, the control signal engaging the braking system when the object in relative motion with respect to the sensor is detected.

13. A lawn vehicle in combination with a back-up protection sensor as defined by claim 10, which further comprises at least one of a visual indicator, an audible indicator and a tactile indicator, the at least one of a visual indicator, an audible indicator and a tactile indicator generating the indication.

14. A method for enhancing the safety of a lawn vehicle, the lawn vehicle including a lawn cutting attachment, the method comprising the steps of:

generating a radio frequency signal;

radiating the radio frequency signal in a substantially hemispherical radiation pattern;

receiving a reflection of the radio frequency signal, the reflection being reflected from an object, in relative motion with respect to the lawn vehicle, in a predetermined detection region;

combining at least a portion of the radio frequency signal with the received reflection and generating an intermediate frequency signal having at least a sum component and a difference component corresponding to the addition and subtraction of the radio frequency signal and the reflection respectively;

filtering the intermediate frequency signal to substantially remove the sum component, thereby generating a Doppler signal;

comparing the Doppler signal with a predetermined reference signal and generating a sensor output signal when the Doppler signal level exceeds the reference signal level; and providing a warning indication, the warning indication being responsive to the sensor output signal and indicating the presence of the object in relative motion with respect to the lawn vehicle within the detection region.

15. A method for enhancing the safety of a lawn vehicle as defined by claim 14, further comprising the step of generating a control signal, the control signal being responsive to the sensor output signal and disabling the cutting attachment when the object is detected in the detection region.

* * * * *